United States Patent Office 3,441,692
Patented Apr. 29, 1969

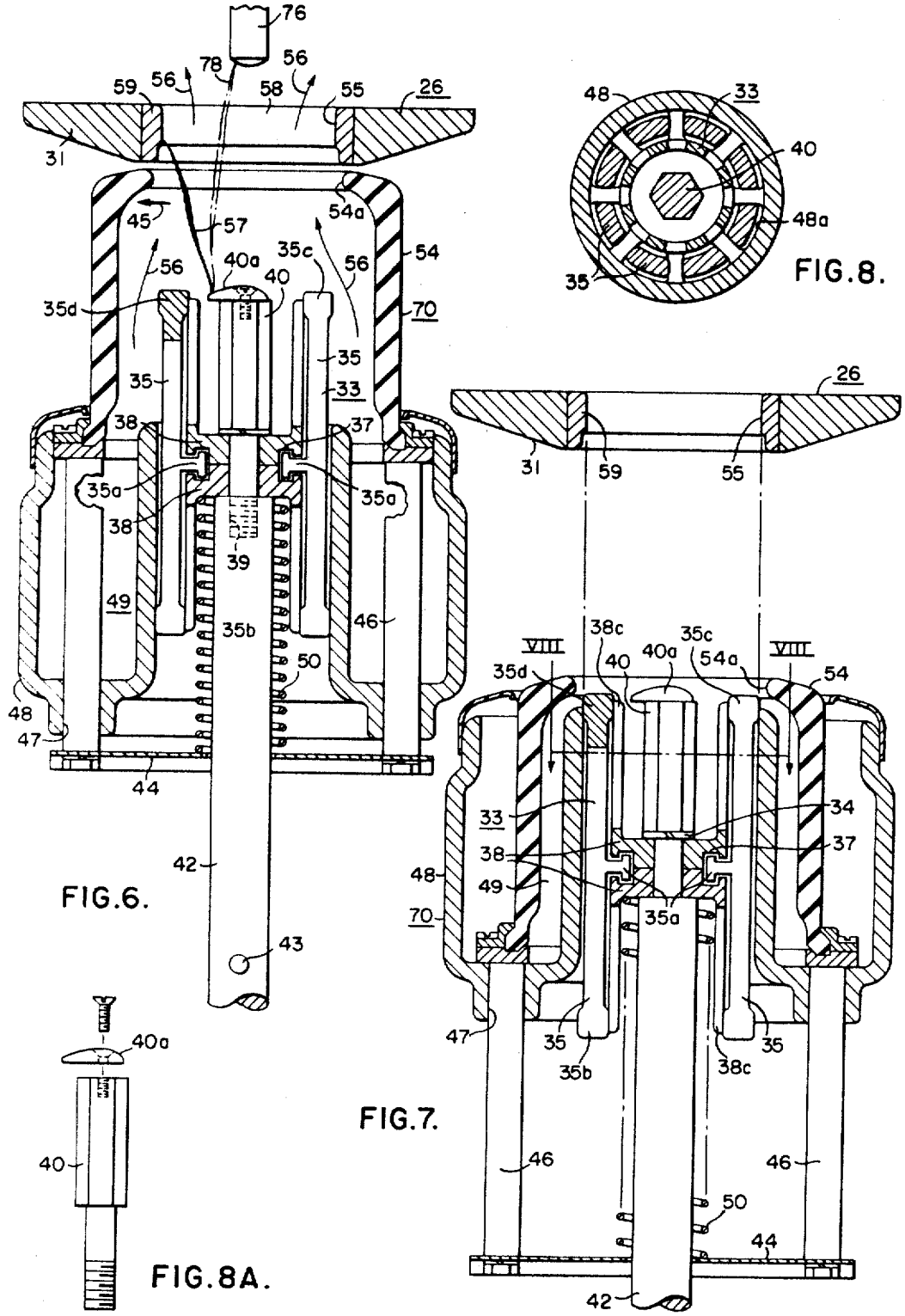

3,441,692
MOVABLE BRIDGING CONTACT STRUCTURE FOR POWER CIRCUIT INTERRUPTERS
Charles F. Cromer, Trafford, and Charles B. Wolf, Irwin, Pa., assignors to Westinghouse Electric Corporation, Pittsburgh, Pa., a corporation of Pennsylvania
Filed Dec. 2, 1966, Ser. No. 598,857
Int. Cl. H01h *31/14, 33/82*
U.S. Cl. 200—48
11 Claims

ABSTRACT OF THE DISCLOSURE

Double-ended movable flexible bridging contact fingers are provided to open and close the electrical circuit between spaced stationary contacts. In some forms of the invention, removable double-ended contact fingers are held captive by a pair of abutting retainer elements, which additionally provide flexible spring pressure for the individual contact fingers. A centrally-located arcing horn may be provided as a mounting bolt for the assemblage.

---

This invention relates, generally, to circuit interrupters and, more particularly, to movable bridging contact structures for circuit interrupters of the double-break high-speed type carrying relatively heavy current values in the closed-circuit position.

A general object of the present invention is to provide an improved and highly-efficient movable bridging contact structure for a heavy-current-duty circuit interrupter, which will be able to transmit heavy currents therethrough, and yet is capable of high-speed operation.

Still a further object of the present invention is the provision of a circuit interrupter capable of carrying heavy continuous currents, and adaptable for utilization with compressed-gas fluid flow for efficient arc extinction.

Another object of the present invention is the provision of an improved movable bridging contact means for a circuit interrupter capable of relatively high contact pressure, and additionally adaptable for ease of inspection, and removal and replacement during maintenance operations.

Another object of the present invention is the provision of an improved bridging contact structure in which individual contact-finger elements are removably locked into position by novel retainer means.

Still a further object of the present invention is the provision of an improved movable bridging contact structure of the type set forth in the immediately preceding paragraph, in which the retaining means comprises a pair of abutting cup-shaped retainer elements having locking portions provided therein to removably lock the individual contact-finger elements into operative position.

Still a further object of the present invention is the provision of an improved bridging contact construction comprising individual contact-finger elements removably locked into position, and biased radially outwardly by leaf-spring elements supported by locking rings.

In accordance with a preferred embodiment of the invention, there is provided a movable bridging contact means including a plurality of circumferentially-disposed individual contact-finger elements having intermediate locking portions, the latter being removably retained within a retaining means comprising a pair of abutting cup-shaped retainer elements having apertured supporting flange portions, which additionally support a generally centrally-disposed movable arcing horn.

According to another embodiment of the invention, the movable bridging contact means comprises a slotted tubular conducting member having an intermediately-located inwardly-extending apertured supporting flange portion, the latter supporting a centrally-disposed movable arcing horn.

In accordance with another embodiment of the invention, there is provided a plurality of circumferentially-disposed individual contact-finger elements having intermediate locking portions, which are removably retained in an operative position by a pair of retainer members having registered locking recesses, and a pair of locking rings carrying leaf-spring elements are additionally provided with the leaf-spring elements biasing the individual contact fingers radially outwardly for adequate contact pressure in the closed-circuit position of the interrupter.

Further objects and advantages will readily become apparent upon reading the following specification, taken in conjunction with the drawings, in which:

FIG. 6 is a view similar to that of FIG. 5, but illustrating the conditions during the arcing period, while the fluid-guide insulating member conducting gas flow is retained in its upward extended position due to the differential gas pressure thereacross;

FIG. 7 is a view similar to that of FIGS. 5 and 6, but illustrating the disposition of the several parts in the fully open-circuit position;

FIG. 8 is a detailed sectional view of the moving bridging contact structure taken substantially along the line VIII—VIII of FIG. 7;

FIG. 8A is a fragmentary detailed view of the removable arcing horn, which additionally serves as an attachment bolt;

Figure 1:
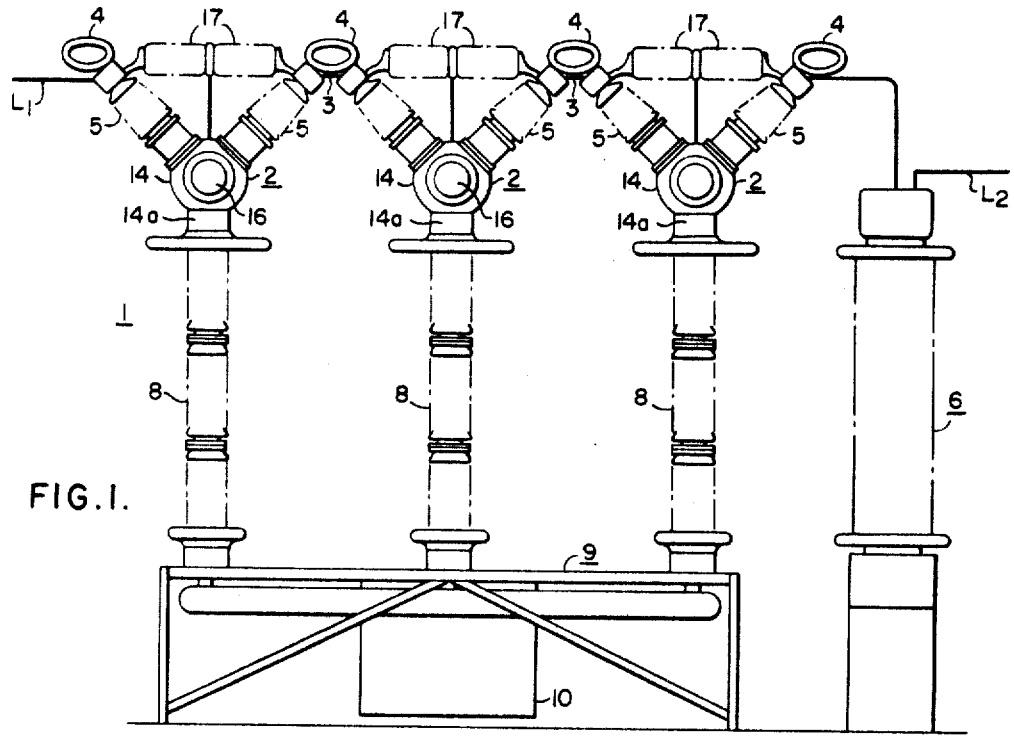
FIGURE 1 is a side elevational view of a three-phase dual-pressure type of compressed-gas circuit interrupter embodying principles of the present invention.
Figure 2:
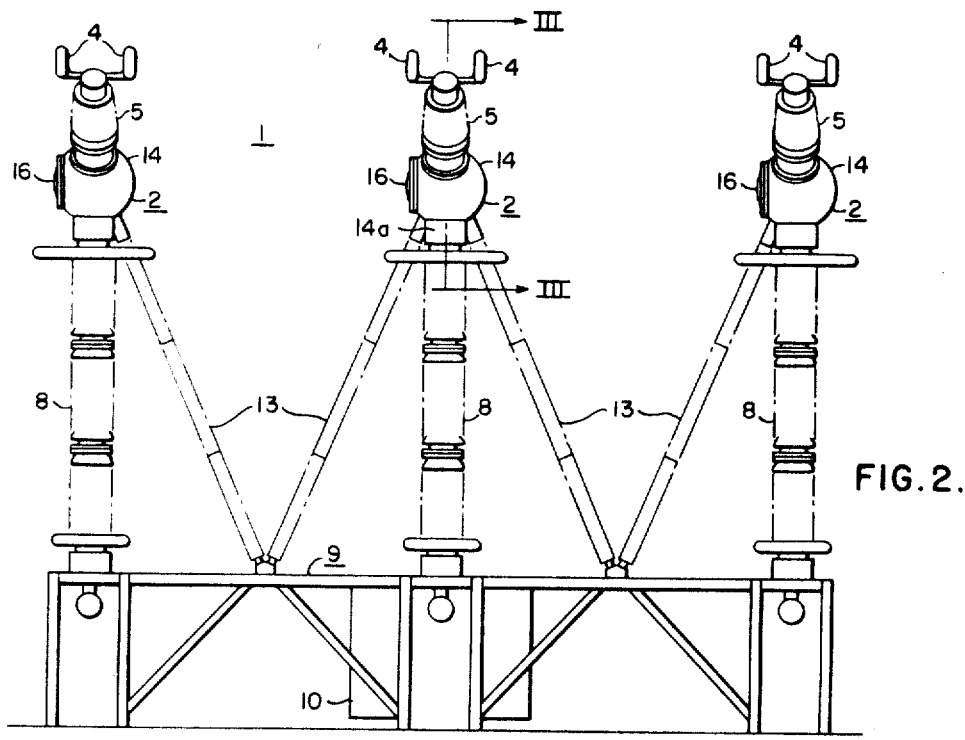
FIG. 2 is an end elevational view of the three-phase compressed-gas circuit interrupter of FIG. 1.

Referring to the drawings, and more particularly to FIGS. 1 and 2 thereof, the reference numeral 1 generally designates a three-phase dual-pressure type of compressed-gas circuit interrupter. As shown, the circuit interrupter 1 comprises three modular units 2 for each phase, such units being electrically connected in series by connectors 3. Electrostatic rings 4 may be used for the prevention of high electrical stresses adjacent the confronting ends of the terminal bushings 5 of the units 2.

If desired, a suitable current-transformer structure 6 may be employed for measurements of the current passing through the interrupter 1 and for relaying purposes.

Supporting the modular units 2 in an upstanding relation at the upper ends of insulating supporting columns 8 is a frame support 9, to which is secured a mechanism housing 10. Disposed interiorly of the mechanism housing 10 is a suitable operating mechanism, which may be of conventional type, and functioning to synchronize the operation of operating rods 11 extending upwardly within each of the supporting insulating columns 8. Reference may be had to the linkage set forth in U.S. patent application filed June 12, 1964, Ser. No. 374,708, now U.S. Patent 3,291,947, issued Dec. 13, 1966 to Roswell C. Van Sickle, and assigned to the assignee of the instant invention, for a possible type of linkage construction. Such linkage, however per se constitutes no part of the present invention.

With reference to FIG. 2 of the drawings, it will be noted that assisting in the upward rigid support of the several modular units 2 are diagonally-extending insulating support rods 13, which provide a desirable bracing construction.

It will be noted that each modular unit 2 comprises a generaly spherical "live" metallic tank 14 at line potential having preferably only a single access manhole 15 associated with a hinged door 16, by means of which access may be obtained interiorly of each tank structure 14.

To assist in dividing the voltage equally between the several modular units 2, and also providing a certain amount of support, is serially-related impedance sections 17, which may comprise resistance or capacitance elements, such as are of the type set forth in U.S. Patent 2,748,226, issued May 29, 1956, to MacNeill et al., and assigned to the assignee of the instant application.

Figure 3:
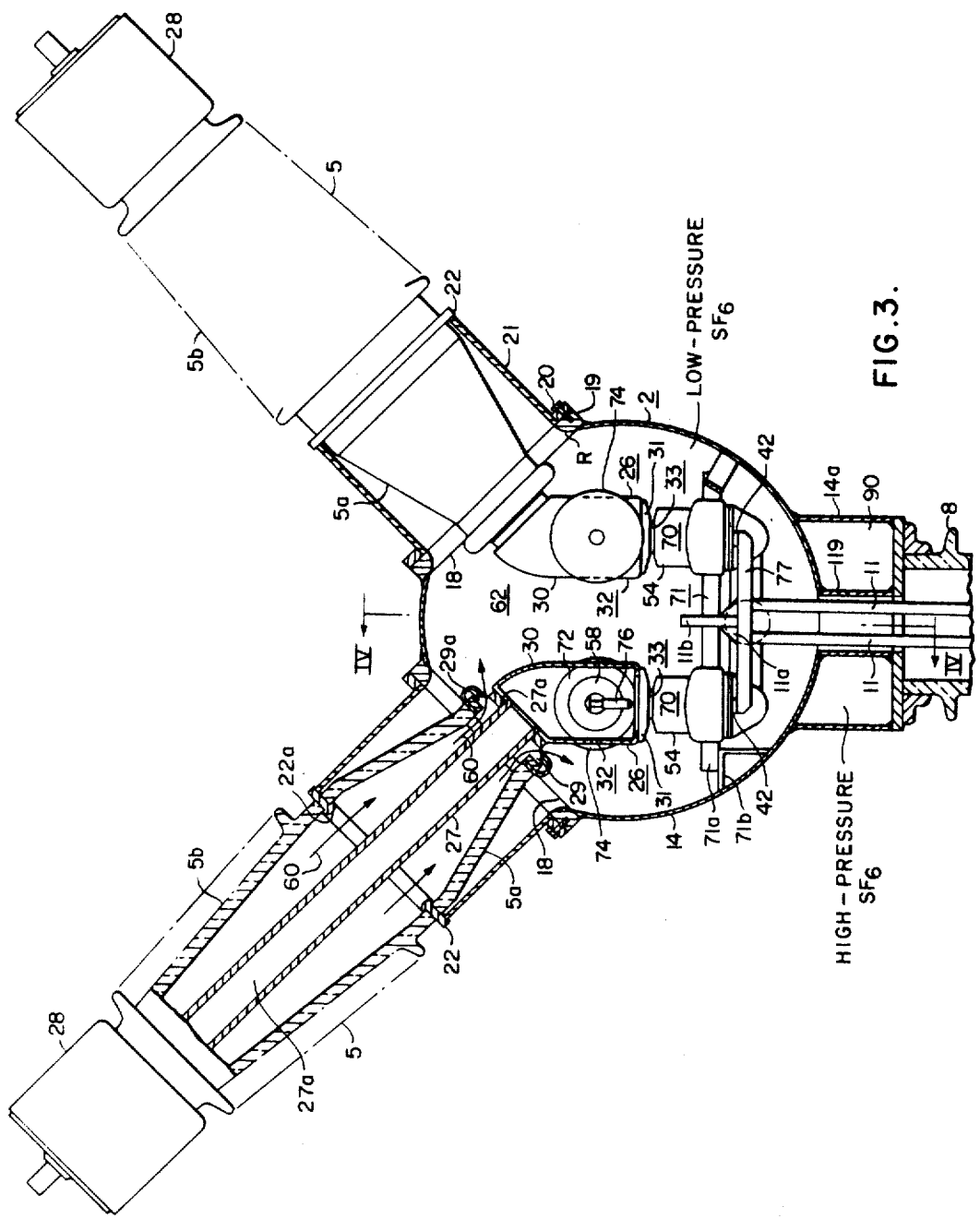
FIG. 3 is a vertical sectional view taken along the line III—III of one of the modular compressed-gas units of FIGS. 1 and 2, the left-hand unit being shown partially in section, and the contact structure of both units being indicated in the closed-circuit position.
Figure 4:
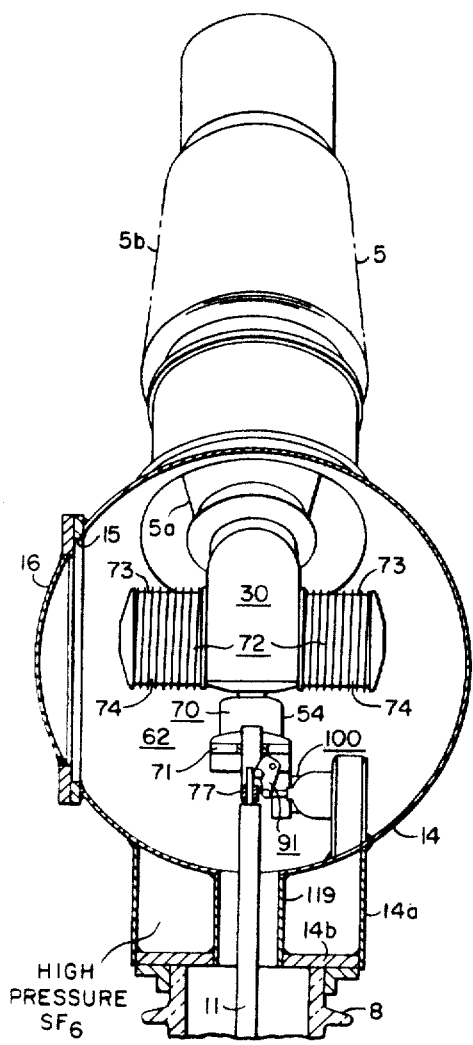
FIG. 4 is a vertical sectional view taken substantially along the line IV—IV of FIG. 3, again the contact structure being illustrated in the closed-circuit position.

With particular attention being directed to FIG. 3 of the drawings, it will be noted that the spherical tank 14 has circular apertures 18 burned, or otherwise cut out thereof and having welded thereto flange collars 19. Each flange collar 19 has fixedly secured thereto, by means of mounting bolts 20, a flanged cylindrical support member 21, to the outer end of which is fixedly mounted the terminal bushings 5 by means of the support ring 22.

In more detail, the terminal bushing 5 comprises a pair of insulating shells 5a, 5b having interposed therebetween the supporting ring 22 having a smoothly curved inner periphery, as shown at 22a (FIG. 3). Extending axially through the terminal bushing 5, and serving the function of carrying the current interiorly of the tank structure 14, and also supporting a stationary contact assembly 26, is a tubular conductor stud 27. The conductor stud 27 may have associated therewith a suitable biasing-spring construction, not shown, and an outer cap structure 28.

Fixedly secured, as by a threading and clamping arrangement, to the interior end 27a of the terminal stud 27 is an apertured support casting 29 having fixedly secured thereto an exhaust chamber 30. As shown, the exhaust chamber 30 includes a lower metallic orifice plate 31 making contacting engagement with a movable bridging contact assembly, generally designated by the reference numeral 33.

It will be observed that the two laterally-spaced exhaust chambers 30 with the lower-disposed stationary contacts 31 constitute a pair of spaced stationary first contact means, generally designated by the reference numeral 32.

Figure 5:
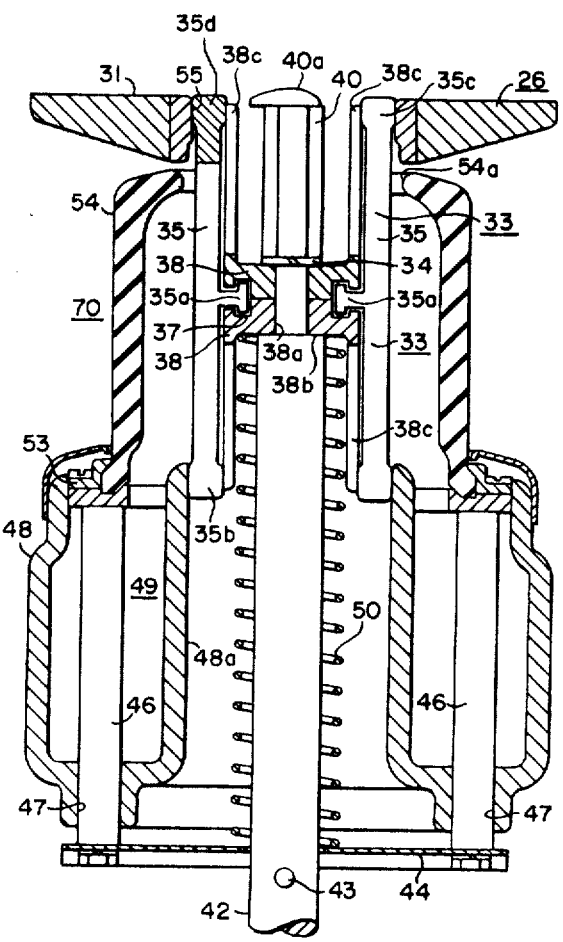
FIG. 5 is an enlarged fragmentary vertical sectional view taken through the separable contact structure of one of the arc-extinguishing units of the arc-extinguishing assemblage of FIGS. 3 and 4, the contact structure being illustrated in the closed-circuit position.

FIGS. 5–8 may be referred to for a more detailed description of the moving bridging contact assemblages 33. With particular reference being directed to FIG. 5 of the drawings, the moving bridging contact assemblages 33 comprise a plurality of removable circumferentially-disposed double-ended contact fingers 35 having an inwardly-extending, generally T-shaped retaining member 35a. The T-shaped retaining portion 35a is somewhat resiliently secured within an enlarged aperture 37 formed by the mating of a pair of complementary-slotted spring cups 38 having central apertures 38a provided therethrough. A rod-shaped arcing horn 40 having an arc-resisting tip portion 40a (FIG. 8A) is provided extending through the pair of apertures 38a and fixedly secured to the upper end of an operating rod or actuating member 42. Extending laterally through the metallic operating rod 42 is an abutment pin 43, which serves, during the closing operation, to pick up a cross-bar 44, generally of channel-shaped configuration. Fixedly secured to the ends of the cross-bar 44 is a pair of metallic push rods 46, which extend through apertures 47 provided through a generally annular cup-shaped casting member 48 defining a gas-entrance chamber 49. Interposed between the base portion 38b of the lower slotted spring assembly 38 and the cross-bar 44 is a compression retrieving spring 50, the function for which will be more clearly apparent hereinafter.

As shown more clearly in FIG. 5, the lower ends 35b of the several spring fingers 35 make sliding contacting engagement with the inner surface 48a of the annular cup-shaped member 48 and serve to transmit current therethrough in the closed-circuit position, as shown in FIG. 5. The two laterally-spaced cup-shaped conducting members 48 constitute a pair of laterally-spaced stationary second contact means, which are electrically connected with the pair of laterally-spaced first contact means 32 by the two moving bridging contact assemblies 33, as shown in FIGS. 3 and 5 of the drawings.

Disposed at the upper ends of the two diametrically-located push-rods 46 is a retaining ring 53 fixedly secured to a fluid-directing nozzle member 54 defining an outlet orifice 54a. It is desirable to position the gas-flow fluid-directing member 54 in an upper extended position in the closed-circuit position of the interrupter, as illustrated in FIG. 5 of the drawings. By suitable means, more clearly described hereinafter, gas is caused to enter within the gas entrance region 49, and this high-pressure gas is driven upwardly through the orifice 54a of the fluid-directing member 54 in the direction of the arrows 56 (FIG. 6) and through the orifice member 31 into the interior 58 of the exhaust member 30. This will serve to extinguish the established arc 57 (FIG. 6), which is drawn between the arcing horn 40 and the stationary orifice contact 59 composed of arc-resisting material, which constitutes the inner periphery of the orifice 55 through the stationary orifice contact 31. The exhausted gas is forced through the interior 27a (FIG. 3) of the terminal stud 27, and by suitable openings, not shown, is forced to return downwardly, as indicated by the arrows 60 of FIG. 3, and through the apertures 29a of the supporting casting 29 to the region 62 interiorly of the tank structures 14.

To assist in the extinction of the arcs 57 established within the interrupting units 70 connected in series by a conducting bus-bar structure or means 71 is a resistance means, generally designated by the reference numeral 72, and comprising a pair of electrically-parallel wire-wound resistance elements 73, wound around laterally off-jutting insulating sleeves 74, and electrically connected between the central exhaust chamber 30 and the centrally-located stationary arcing horn 76.

The blast of gas passing radially inwardly through the fluid-directing member 54 carries the initially established arc, drawn between the contacts 59, 35, to the arcing horns 40, 76 with the two resistor elements 73 electrically in parallel. The reduced current amperage and the improved power factor facilitates the interruption of the arc 78 (indicated by the dotted line of FIG. 6) drawn within each of the arc-interrupting units 70.

To synchronize the opening and closing movements of the two operating rods 42, there is provided a relatively light-weight horizontally-disposed cross-bar 77, fixedly secured to the upper ends of the insulating operating rods 11. Preferably, the upper ends of the operating rods 11 are joined, as at 11a, and provide a guide extension 11b, which may be guided within a suitable guide aperture provided by the conducting bus-bar construction 71.

It will be noted that the stationary conducting bus work means 71, comprising a pair of laterally-spaced conducting bars 71a secured, as by welding, to support brackets 71b secured to metallic tank 14, rigidly supports the spaced stationary second contact means in a rigid position and eliminates the necessity of the movable traverse 77 carrying the series line current in the closed-circuit position of the device, as shown in FIG. 3. This reduces the mass of the moving system and enables an increase of speed.

Figure 9:
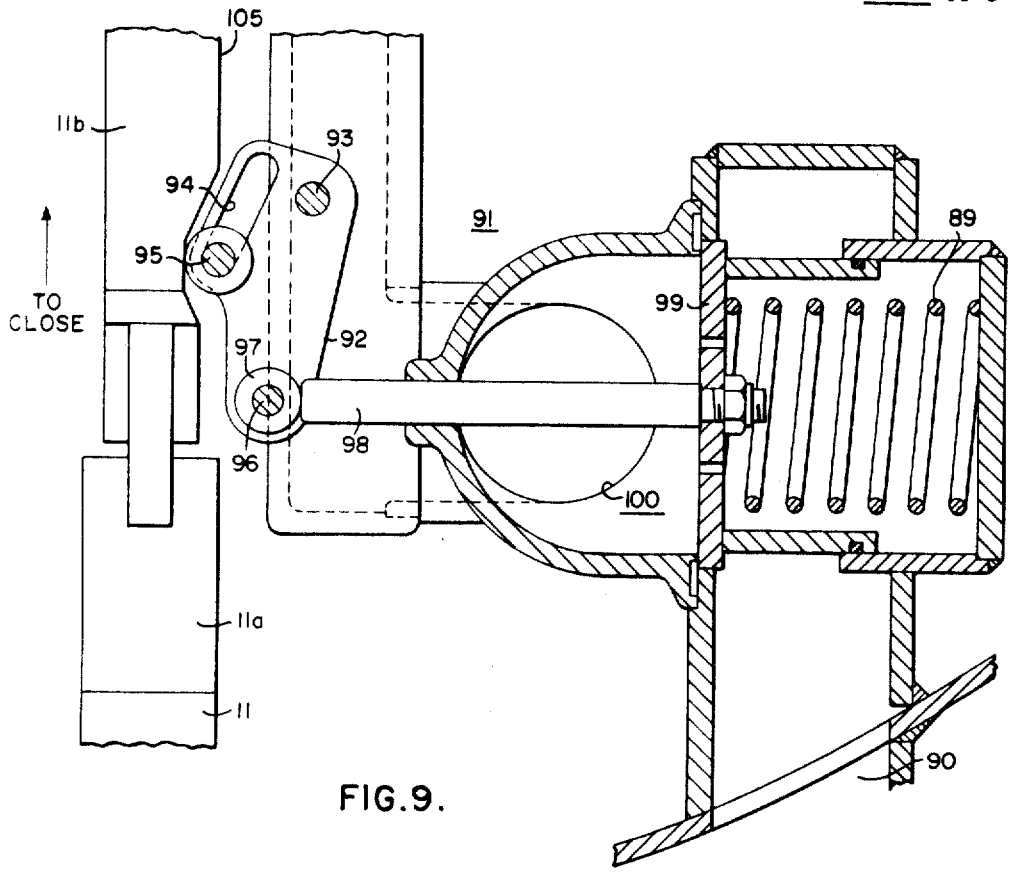
FIG. 9 is a considerably enlarged fragmentary view indicating the blast-valve operating linkage, the blast-valve linkage and the contact-operating rod being illustrated in the closed-circuit position with the blast valve shown closed.

To control the admission of a high-pressure blast of $SF_6$ gas from the high-pressure region 90 (FIG. 3), there is provided a blast-valve assembly, generally designated by the reference numeral 91 (FIG. 9), and including a pair of pivotally-mounted blast-valve levers 92, pivotally mounted about a stationary pivot 93. Each blast-valve lever 92 has an elongated slot 94 provided therethrough, within which slides a roller assembly 95. The roller assembly 95 is biased by springs, not shown, to a roller pin 96, about which is encircled a roller 97, which makes abutment with the valve stem 98 of a blast valve 99. It will, therefore, be apparent that rightward opening movement of the blast-valve stem 98 will cause opening of the blast valve 99 and permit the exhausting of a blast of high-pressure gas through a conduit structure 100 and into the two gas-entrance regions 49 of the two arc-extinguishing units 70.

During the closing operation, the cam portion 105 (FIG. 9), which previously caused opening counterclockwise rotation of the blast-valve lever assembly 92, will cause the roller assembly 95 to move to an inoperative position, that is being moved laterally upwardly along the slots 94 against the spring tension of the biasing spring (not shown). The result will be that there will be no blast occurring during the closing stroke.

Certain features of the fluid-director nozzle construction 54 are set forth and claimed in United States patent application filed Dec. 2, 1966, Ser. No. 598,761, by Albert P. Strom and Charles F. Cromer and assigned to the assignee of the instant application. Certain features of the tank configuration are set forth and claimed in United States application filed Dec. 2, 1966, Ser. No. 598,856, by Winthrop M. Leeds and Albert P. Strom, and assigned to the same assignee. Also certain features of the bus-work means 71 and light-weight cross-bar 77 are set forth and claimed in U.S. paatent application filed Dec. 2, 1966, Ser. No. 598,807 by Charles F. Cromer and Charles B. Wolf and assigned to the same assignee.

It may be convenient to weld a steel pipe 119 through the top and bottom ends of the high-pressure chamber 90, preferably on the central axis for two purposes. One is to provide a duct for leading low-pressure gas from the main tank 14 to the porcelain supporting column 8 and then to ground. A connection to a gas compressor allows this gas to be raised to a high pressure and stored, first in a reservoir at ground potential, and then carried up through an insulated pipe, as needed, to the reservoir 90 at high potential.

By way of recapitulation, during the opening operation, the operating rods 11, extending upwardly within the insulating columns 8 are forcibly moved downwardly by suitable mechanism disposed interiorly within the operating housing 10. The downward opening movement of the operating rods 11 causes simultaneous downward opening movement of the cross-bars or traverse members 77, and the bridging contact structures 33. The camming action of the cam 105 (FIG. 9) secured to the operating rods 11 effects opening of the blast-valve structure 91 and causes the entrance of high-pressure gas into the gas-entrance chamber 49. This will maintain the fluid-directing orifice members 54 in their upper position, as illustrated in FIG. 6, despite the fact that the bridging members 33 will be forcibly moved downwardly causing separation between the pickup pin 43 and the cross-bar 44. The gas pressure within the region 49 will be greater than the spring pressure exerted by the compression spring 50. The net result is that the fluid-directing nozzle member 54 will be maintained in its upper extended position during arc interruption, as shown more clearly in FIG. 6 of the drawings.

The downward movement of the bridging contact assembly 33 will initially draw an arc between the contact portions 35c and 59. The upwardly-flowing high-pressure gas flowing through the orifice opening 55 and into the exhaust chamber 58 will effect arc transfer from the separating contacts 35c, 59 to the arc horns 40, 76, thereby inserting the two resistor elements 73 into series circuit, thus reducing the amperage of the current being interrupted. The residual-current arc is established between the arcing contacts 40, 76 and the longitudinal passage of the high-pressure gas into the exhaust region 58, as indicated by the arrows in FIG. 6, will quickly effect extinction of this residual-current arc 78. Further downward opening movement of the operating rods 11 will cause the cam 105 to ride off of the blast-valve roller 95, thereby permitting the compression spring 89 to effect reclosure of the blast valve 99.

The reduction of the pressure within the entrance region 49, resulting from reclosure of the blast valve 99, will permit the retrieving compression spring 50 to effect downward retracting motion of the fluid guide 54 to a position illustrated in FIG. 7 of the drawings. The interrupter 1 is now in the open-circuit position with the fluid director 54 in its lowered position improving the dielectric conditions at the contact gap.

During the closing operation, suitable mechanism disposed interiorly of the mechanism housing 10, will be effective to cause upward closing motion of the several operating rods 11. The upward closing motion of the operating rods 11 will effect, through the cross-bars 77, upward movement of the operating rods 42. This motion will continue until the pickup pin, or abutment 43, strikes the cross-bar 44, thereby causing the fluid director 54 to move upwardly with the bridging contact structure 33 as a unit. Such closing motion continues until the bridging contacts 33 assume the position illustrated in FIG. 5 of the drawings.

For replenishment of the high-pressure gas within the high-pressure reservoir 90 there is preferably provided a compressor, as previously mentioned, and a suitable insulating feed conduit, which extends upwardly within the insulating column 8 of each unit 2.

From the foregoing description it will be apparent that there is provided an improved compressed-gas circuit interrupter having an improved structure, for carrying heavy currents continuously, yet is high-speed in operation. In addition, the construction is suitable for multiple units in series for the higher voltage applications. For example, for 500-kv. application, three units, such as illustrated in FIG. 1, would be required. For a lower-voltage rating, of course, the number of units 2 could be reduced.

In the design of movable bridging contacts 33, at least three principles must be kept in mind. Contact pressure must be kept relatively high to counteract the magnetic effects in the circuit interrupter, optimum cross-sectional area in the contact elements must be provided for current-carrying ability yet with a low mass, and, most importantly, there must be ready availability for inspection and/or replacement of the contact fingers. Perhaps an additional item which should also be considered is wear and errosion resulting from current interruption.

With reference to FIGS. 5–8 of the drawings, it will be noted that the bridging contact means 33 provides a flexible removable high-pressure-bearing contact construction, with the individual removable circumferentially-disposed contact finger elements 35 being biased radially outwardly within the annular recess 37 by the provision of the leaf-spring elements 38c, which are individually supplied for each removable contact finger element 35.

It will be observed that by a removal or unthreading of the arcing horn 40 (which may, for example, be made of conducting hexagonal stock) from the upper tapped opening 39 of operating rod 42, and a removal of the locking washer 34, the abutting spring cups 38 may be removed, and the individual contact-finger elements 35 removed and replaced, as desired. Since there is a tendency for the arc 57 (FIG. 6) to be moved outwardly in the direction indicated by the arrow 45 during the arcing operation, the finger elements disposed to the left, as viewed in FIG. 6, may be supplied with arc-resisting tip portions 35d, and since these particular finger elements may be the only ones to be subjected to heavy arcing conditions, they may be the only ones necessary to be replaced. The construction has the advantage that the remaining finger elements 35 may be reused, and only the badly eroded finger elements replaced.

Additionally, an arc-resisting directional tip portion 40a may be screwed into the upper extremity of arcing rod 40, and rotated to be directed outwardly, as illustrated in FIGS. 5–8. This is desirable since the current loop circuit through the interrupter 1 sets up a magnetic field tending to bow the arcs outwardly. More specifically, the arc 57 in the left hand unit 70 of FIG. 3 will be magnetically moved to the left, whereas the arc 57 in the right hand unit 70 of FIG. 3 will be moved toward the right, and the directional features of the arcing tips 40a accommodate this action.

Figure 10:
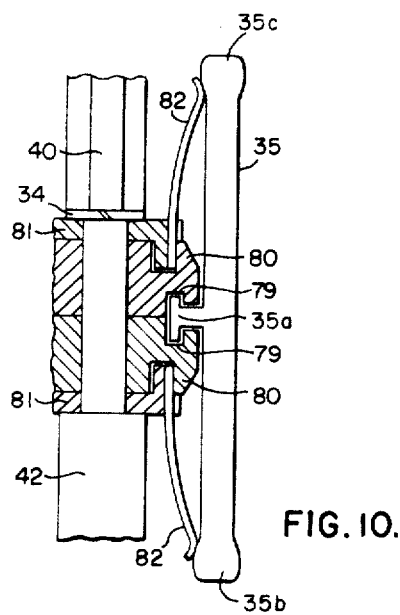
FIG. 10 is a vertical sectional view taken through a modified-type of movable contact-bridging construction.

FIG. 10 illustrates a modification of the invention in which the individual contact finger elements 35 are retained within mating annular locking recesses 79 provided in abutting retainer members 80; and there are additionally provided locking rings 81 carrying leaf-spring elements 82 for individually bearing upon the removable contact fingers 35. The leaf-spring elements 82 may be made of steel, or other suitable resilient alloy. Again, there is provided ease of inspection and removal of the individual contact fingers 35.

Figure 11:
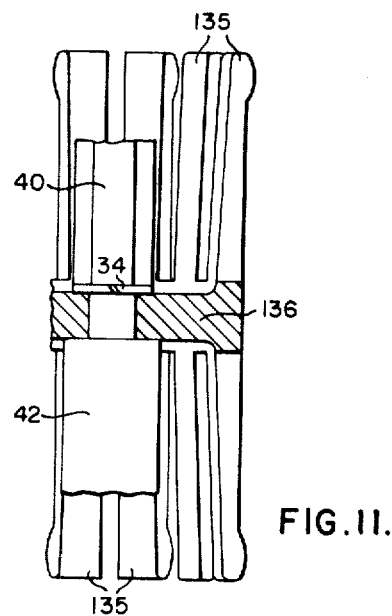
FIG. 11 is a vertical sectional view taken through still another modified-type of movable bridging contact construction.

FIG. 11 illustrates another modified form of contact-finger construction, in which the contact fingers 135 are formed by slotting a generally tubular conducting member at opposite ends thereof having an intermediate apertured inwardly-extending flange portion 136. In this construction, the radially-outwardly-acting biasing action is provided by the inherent resiliency of the generally tubular-shaped conducting member.

Although there has been illustrated and described specific structures, it is to be clearly understood that the same were merely for the purpose of illustration, and that changes and modifications may readily be made therein by those skilled in the art without departing from the spirit and scope of the invention.

We claim as our invention:

1. A circuit interrupter including a pair of spaced stationary generally hollow contact means and a movable bridging contact means electrically interconnecting said pair of spaced stationary generally hollow contact means in the closed-circuit position of the interrupter, said movable bridging contact means comprising a plurality of circumferentially-extending contact fingers biased radially outwardly, said contact fingers being separate elements and having an intermediate-disposed generally T-shaped locking portion disposed radially inwardly of the contact portions thereof.

2. The combination according to claim 1, wherein separate leaf springs are provided for the end portions of the contact fingers.

3. A circuit interrupter including a pair of spaced stationary generally hollow contact means and a movable bridging contact means electrically interconnecting said pair of spaced stationary generally hollow contact means in the closed-circuit position of the interrupter, said movable bridging contact means comprising a plurality of circumferentially-extending contact fingers biased radially outwardly, and a centrally-located arcing horn being provided, and a rod-shaped actuating member forming an extension of said arcing horn.

4. The combination of claim 1, wherein two slotted cup-shaped retainer members have recesses to accommodate the generally T-shaped locking portions.

5. A movable bridging contact member for a circuit interrupter including a pair of abutting slotted cup-shaped retainer members having central apertures therethrough and mating annular retaining recesses therein, a plurality of individual contact finger elements spaced circumferentially around said slotted cup-shaped retainer members with integral T-shaped locking portions disposed within the mating recesses of said retainer members, and the portions between the slots of the retainer members serving as leaf spring members to bias the individual contact fingers radially outwardly.

6. The combination according to claim 5, wherein a central arcing horn is secured in the registered apertures of the retainer members.

7. The combination of claim 1, wherein a pair of locking rings carrying leaf spring elements are in abutment with an intermediate pair of retainer members having registered locking recesses for the T-shaped locking portions, and means secures the locking rings and retainer members together.

8. The combination of claim 3, wherein a directional arc-resisting tip portion is provided on the centrally-located arcing horn.

9. The combination of claim 6, wherein the central arcing horn has a directional arcing tip portion.

10. The combination of claim 3, wherein means removably mount said arcing horn to removably retain said contact fingers into operative position.

11. The combination of claim 3, wherein the contact fingers are provided by slotting the opposite ends of a tubular conducting member having an intermediate apertured inwardly-extending flange portion.

References Cited
UNITED STATES PATENTS

| | | | |
|---|---|---|---|
| 1,968,869 | 8/1934 | Austin | 200—163 X |
| 2,376,818 | 5/1945 | Rubel | 200—166 |
| 3,214,547 | 10/1965 | Telford | 200—148 |
| 3,271,548 | 9/1966 | Kesselring | 200—146 |

ROBERT K. SCHAEFER, *Primary Examiner.*

H. J. HOHAUSER, *Assistant Examiner.*

U.S. Cl. X.R.

200—148